(12) United States Patent
Hwang et al.

(10) Patent No.: US 8,605,312 B2
(45) Date of Patent: Dec. 10, 2013

(54) PERFORMING A PRINT JOB BY HAVING A HOST CHANGE A PORT OF AN IMAGE FORMING APPARATUS IF THE IP ADDRESS OF THE IMAGE FORMING APPARATUS HAS CHANGED

(75) Inventors: Tae-kyung Hwang, Seoul (KR); Jung-soo Seo, Suwon-si (KR); Sung-joon Park, Hwaseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 939 days.

(21) Appl. No.: 12/659,659

(22) Filed: Mar. 16, 2010

(65) Prior Publication Data

US 2011/0058203 A1    Mar. 10, 2011

(30) Foreign Application Priority Data

Sep. 4, 2009    (KR) .................. 10-2009-0083656

(51) Int. Cl.
*G06F 3/12* (2006.01)
(52) U.S. Cl.
USPC .......................................................... 358/1.15
(58) Field of Classification Search
USPC .......................................................... 358/1.15
See application file for complete search history.

(56) References Cited

U.S. PATENT DOCUMENTS

2003/0117645 A1    6/2003    Han
2005/0271049 A1*   12/2005   Jain et al. ................. 370/389

FOREIGN PATENT DOCUMENTS

KR    2003-0052008    *    6/2003

* cited by examiner

*Primary Examiner* — Eric A Rust
(74) *Attorney, Agent, or Firm* — Staas & Halsey LLP

(57) ABSTRACT

A print control method of a host apparatus which is connected to at least one image forming apparatus in a network, the method including receiving changed IP information from the at least one image forming apparatus; determining whether the host apparatus performs a print job with respect to the image forming apparatus which has the changed IP information; holding the print job if there is the print job; changing a print option for the print job; and transmitting print data corresponding to the print job according to the changed print option. With this, the apparatus and the method may normally perform a print job by changing a port of an image forming apparatus and prevent data loss due to a failure to change the port normally even if there is a print job for an image forming apparatus whose IP address is changed.

13 Claims, 9 Drawing Sheets

30

CHANGE NOTIFICATION FOR PRINTER SETUP INFORMATION

THE PORT INFORMATION OF THE CURRENTLY SELECTED PRINTER HAS BEEN CHANGED FROM 10.10.10.10 TO 10.10.9.3.
WILL YOU APPLY THE CHANGED PORT NOW?

31 — YES    NO — 32

IF YOU SELECT NO, A COMPATIBLE PRINTER WILL BE SEARCHED.

PERFORMING A PRINT JOB BY HAVING A HOST CHANGE A PORT OF AN IMAGE FORMING APPARATUS IF THE IP ADDRESS OF THE IMAGE FORMING APPARATUS HAS CHANGED

CROSS-REFERENCE TO RELATED APPLICATIONS

This application claims priority from Korean Patent Application No. 10-2009-0083656, filed on Sep. 4, 2009, in the Korean Intellectual Property Office, the disclosure of which is incorporated herein by reference.

BACKGROUND

1. Field

Apparatuses and methods consistent with the present disclosure relate to a host apparatus connected to an image forming apparatus and a print control method thereof, and more particularly, to a host apparatus connected to an image forming apparatus and a print control method thereof which normally completes a print job with respect to the image forming apparatus whose IP information is changed.

2. Description of the Related Art

An image forming apparatus forms an image on a print paper. The image forming apparatus may include a printer, a photocopier, a facsimile, a multi-function device which has at least two functions, etc.

The image forming apparatus is connected to a host apparatus in a wired/wireless network, and performs a job by receiving and transmitting various data including print data and commands through the connected host apparatus.

Generally, the image forming apparatus which is connected in a network has a predetermined Internet Protocol (IP) address assigned. The host apparatus may transmit data or commands for various jobs to the image forming apparatus by setting the IP address assigned to a particular image forming apparatus as port information of the image forming apparatus.

The host apparatus includes a monitoring program to consistently receive various information including an IP address of the image forming apparatus and normally communicate with the image forming apparatus in a network.

If an IP address of a particular image forming apparatus is changed, the host apparatus detects real-time the changed IP address by using the monitoring program, and resets port information with the changed IP address to use the image forming apparatus.

If there is an ongoing print job in the host apparatus including the foregoing monitoring program at the time when the changed IP address is detected, e.g., if print data are being spooled or spooled print data are being transmitted to an image forming apparatus, the port information is not changed even upon request for change, resulting in data loss and a failure to perform the print job.

Furthermore, a user should manually change the port information and retry the failed print job. This is inconvenient for a user and wastes unnecessary time.

SUMMARY

Accordingly, it is an aspect to provide a host apparatus connected to an image forming apparatuses and a print control method thereof which normally performs a print job by changing a port of the image forming apparatus if there is a print job for the image forming apparatus whose IP address is changed.

Also, it is another aspect to provide a host apparatus connected to an image forming apparatus and a print control method thereof which normally performs a print job by using a replacement image forming apparatus of the image forming apparatus whose IP address is changed.

Additional aspects and/or advantages will be set forth in part in the description which follows and, in part, will be apparent from the description, or may be learned by practice of the invention.

The foregoing and/or other aspects are also achieved by providing a print control method of a host apparatus which is connected to at least one image forming apparatus in a network, the method including receiving changed IP information from the at least one image forming apparatus; determining whether the host apparatus performs a print job with respect to the image forming apparatus which has the changed IP information; holding the print job if there is the print job; changing a print option for the print job; and transmitting print data corresponding to the print job according to the changed print option.

The changing the print option for the print job may include resetting port information of the image forming apparatus with the changed IP information or changing a port of the image forming apparatus with IP information of another image forming apparatus which is compatible with a driver of the image forming apparatus having the changed IP information.

The changing the print option for the print job may include searching at least one image forming apparatus which is compatible with a driver of the image forming apparatus whose changed IP information is detected; and displaying a search result if a port of the image forming apparatus is changed to IP information of another image forming apparatus compatible with the driver of the image forming apparatus having the changed IP information.

The method may further include selecting one of image forming apparatuses which are displayed according to the search result.

The method may further include selecting whether to reset port information of the image forming apparatus having the changed IP information with the IP information of the selected image forming apparatus.

The print job may include a print job before print data are transmitted to the image forming apparatus.

The receiving the changed IP information may include determining whether the IP information is changed by monitoring setup information received from at least one image forming apparatus, or receiving setup information on a change of the IP information from the image forming apparatus.

The method may further include verifying the changed IP information.

Another aspect of the present invention is achieved by providing a host apparatus which is connected to at least one image forming apparatus in a network, the host apparatus including a communication interface unit which receives changed IP information from the at least one image forming apparatus; a storage unit which stores therein setup information including a print option for the at least one image forming apparatus; a user interface unit which receives a user's selection; and a controller which determines whether the host apparatus performs a print job with respect to the image forming apparatus having the changed IP information received through the communication interface unit, holds a print option if there is the print job, changes the print option for the print job according to the user's selection and stores the changed print option in the storage unit, and controls the communication interface unit to transmit print data corresponding to the print job according to the changed print option.

The controller may change the print option for the print job by resetting port information of the image forming apparatus with the changed IP information or by changing a port of the image forming apparatus with IP information of another image forming apparatus which is compatible with a driver of the image forming apparatus whose changed IP information is detected.

The host apparatus may further include a display unit, wherein the controller may control the communication interface unit to search at least one image forming apparatus which is compatible with a driver of the image forming apparatus, whose changed IP information is detected, and controls the display unit to display a search result if a port of the image forming apparatus is changed to IP information of another image forming apparatus compatible with the driver of the image forming apparatus whose changed IP information is detected.

The display unit may display at least one image forming apparatus to be selected according to the search result, and the user interface unit is used to select one of the displayed image forming apparatuses.

The user interface unit may be used to select whether to reset port information of the image forming apparatus, whose IP information is changed, with IP information of the selected image forming apparatus.

The print job may include an job before print data are transmitted to the image forming apparatus.

The controller may determine whether the IP information is changed by monitoring setup information received from at least one image forming apparatus through the communication interface unit or receives the changed IP information by receiving the setup information on the change of the IP information from the image forming apparatus.

The controller may control the communication interface unit to verify the changed IP information.

BRIEF DESCRIPTION OF THE DRAWINGS

The above and/or other aspects of the present invention will become apparent and more readily appreciated from the following description of the embodiments, taken in conjunction with the accompanying drawings of which.

DETAILED DESCRIPTION

Hereinafter, exemplary embodiments will be described with reference to accompanying drawings, wherein like numerals refer to like elements and repetitive descriptions will be avoided as necessary.

Figure 1:
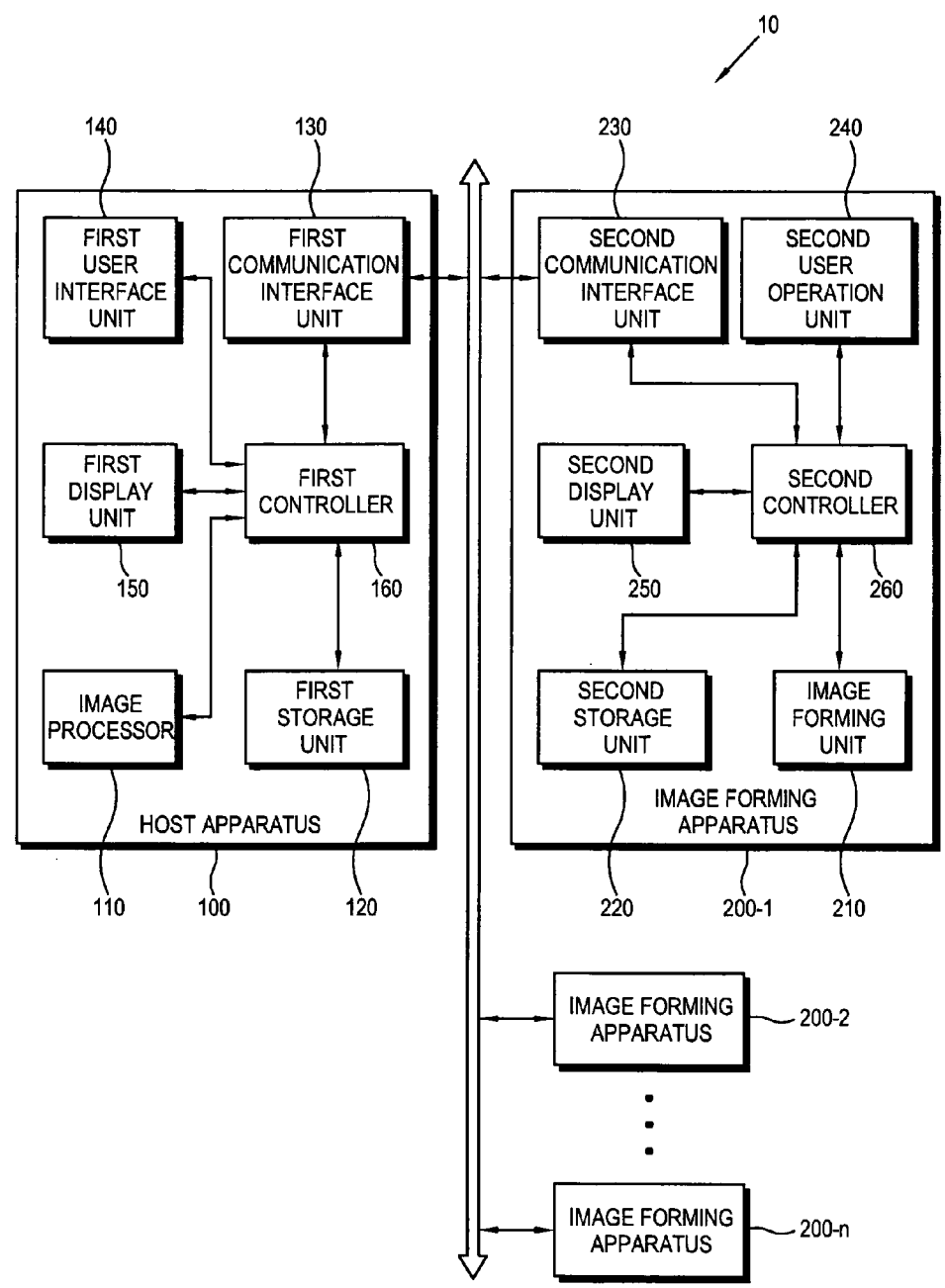
FIG. 1 is a block diagram of a host apparatus, an image forming apparatus and a network print system including the same according to an exemplary embodiment.

FIG. 1 is a block diagram of a network print system 10 which includes a host apparatus 100 and an image forming apparatus 200 according to an exemplary embodiment.

As shown therein, the network print system 10 includes the host apparatus 100 and at least one of image forming apparatuses 200-1, 200-2, . . . and 200-n.

The network print system 10 may further include an image forming apparatus server (not shown). The image forming apparatus server may be provided separately or included in the host apparatus 100.

The host apparatus 100 is connected to at least one of the image forming apparatuses 200-1, 200-2, . . . and 200-n in a network and receives network setup information including an IP address from the at least one of the image forming apparatuses 200-1, 200-2, . . . and 200-n.

If the image forming apparatus server is provided separately, it may receive various setup information including the network setup information from the at least one of the image forming apparatuses 200-1, 200-2, . . . and 200-n connected in a network to store the information therein. The host apparatus 100 may receive the network setup information including the IP address from the image forming apparatus server.

The host apparatus 100 may include a personal computer (PC). The image forming apparatuses 200-1, 200-2, . . . and 200-n may include a printer or a multi-function device performing at least two functions, which includes an image forming unit 260 performing a print job according to a print command. The image forming apparatuses 200-1, 200-2, . . . and 200-n may be connected in a network, or by a local connection, a USB, parallel, UNC, etc.

Here, the print job includes a print job to copy a scanned document, a print job for received fax data and a print job for print data received from the outside through the host apparatus 100 including a server or print data stored in an inside (hard disk drive) or outside (USD memory stick) of the image forming apparatuses 200-1, 200-2, . . . and 200-n.

The image forming apparatuses 200-1, 200-2, . . . and 200-n may be shared as a network image forming apparatus having their own IP addresses assigned in a network.

The network image forming apparatus is connected to at least one host apparatus 100 in a communication network. FIG. 1 illustrates only one image forming apparatus 100 in the network print system 10 for purposes of convenience, and the embodiments are not limited to one host apparatus 100.

According to an exemplary embodiment, a monitoring program is installed in the host apparatus 100 to monitor setup information of at least one of the image forming apparatuses 200-1, 200-2, . . . and 200-n. The monitoring program may be included in a printer driver to use the image forming apparatuses 200-1, 200-2, . . . and 200-n depending on the type of the image forming apparatuses 200-1, 200-2, . . . and 200-n, and various applications and solutions to extend functions of the image forming apparatuses 200-1, 200-2, . . . and 200-n.

As shown therein, the host apparatus 100 includes an image processor 110, a first storage unit 120, a first communication interface unit 130, a first user interface unit 140, a first display unit 150 and a first controller 160.

The image processor 110 generates print data in a predetermined print language according to a print command received through the first user interface unit 140. The generated print data are transmitted to one of the image forming apparatuses 200-1, 200-2, . . . and 200-n through the first communication interface unit 130.

The first storage unit 120 stores therein various setup information including network setup information for at least one of the image forming apparatuses 200-1, 200-2, . . . and 200-n which are connected in a network through the first communication interface unit 130. The network setup information may include port information as a driver attribute that is set up for each of the image forming apparatuses 200-1, 200-2, . . . and 200-n. The port information may include an IP address assigned for the respective image forming apparatuses 200-1, 200-2, . . . and 200-n in a network.

The first storage unit 120 may include an internal or external storage module such as a hard disk drive (HDD), a flash memory, etc. The first storage unit 120 of the host apparatus 100 according to the present invention may further store therein authentication information to authenticate a user or an administrator mode (to be described later).

The first storage unit 120 may further store therein a monitoring program which is installed to receive network setup information from the image forming apparatuses 200-1, 200-2, . . . and 200-n and compare the received IP information with prestored information to change the prestored information, and history information of setup information which is changed by the monitoring program.

The first communication interface unit 130 communicates with at last one of the image forming apparatuses 200-1, 200-2, . . . and 200-n according to a predetermined protocol.

More specifically, the host apparatus 100 receives various information including the network setup information from at least one of the image forming apparatuses 200-1, 200-2, . . . and 200-n through the first communication interface unit 130. The received network setup information may include IP information of the concerned image forming apparatus.

The first communication interface unit 130 may consistently receive the IP information from each of the image forming apparatuses 200-1, 200-2, . . . and 200-n.

To support this function, the monitoring program may be installed in the host apparatus 100 to obtain IP information. The monitoring program may be included in a printer driver or provided as a separate application or solution.

The host apparatus 100 may consistently receive the IP information by using the monitoring program while receiving and transmitting data with respect to at least one of the image forming apparatuses 200-1, 200-2, . . . and 200-n according to a predetermined protocol. To obtain the IP information, the monitoring program may transmit an IP notification request packet to at least one of the image forming apparatuses 200-1, 200-2, . . . and 200-n according to a predetermined period while the image forming apparatuses 200-1, 200-2, . . . and 200-n may transmit an IP notification packet to the host apparatus 100 in response to the IP notification request packet.

The IP information which is transmitted to the host apparatus 100 includes a packet in a predetermined format.

Figure 2:
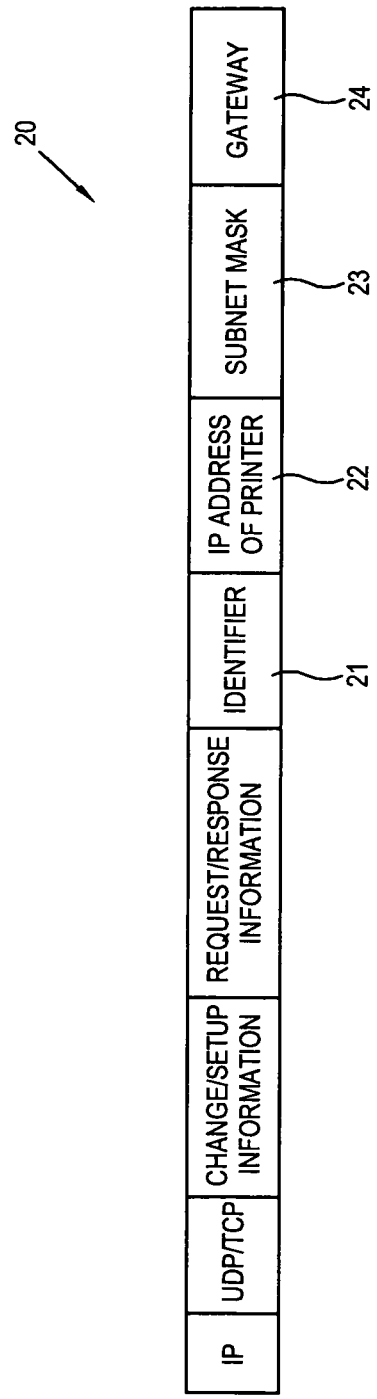
FIG. 2 illustrates an example of an IP information packet which is received from the image forming apparatus.

FIG. 2 illustrates an example of an IP notification packet 20 transmitted from the image forming apparatuses 200-1, 200-2, . . . and 200-n.

Referring to FIG. 2, the network IP notification packet 20 may be used in a network based on TCP/IP. A network protocol may include a user datagram protocol (UDP), a transmission control protocol (TCP), an internetwork packet exchange (IPX), a sequenced packet exchange (SPX) or other protocols.

A port number includes a port defined by a user, and a port set by a developer. A data format refers to change/setup information and request/response information. For example, the change/setup information or the request/response information may have four-bit flags assigned respectively. Among the flags, only one bit may be used and the remaining three bits may be reserved.

An identifier 21 refers to an H/W address of the respective image forming apparatuses 200-1, 200-2, . . . and 200-n in a network. For example, the identifier 21 may be 6 bytes. An IP address 22, a subnet mask 23 and a gateway 24 of the image forming apparatus may refer to network setup information of the image forming apparatus. The IP address 22, the subnet mask 23 and the gateway 24 may be 4 bytes, respectively.

The first communication interface unit 130 consistently transmits and receives the IP notification packet by an execution of the monitoring program as in FIG. 2. The IP notification packet may be received by one of a broadcast, a multicast and a unicast.

The first controller 160 may determine whether to change IP information by comparing the IP information received by the monitoring operation with the preset network setup information stored in the first storage unit 120. The first controller 160 detects changed IP information of a predetermined image forming apparatus.

According to another exemplary embodiment, a predetermined IP change packet may be transmitted from a predetermined image forming apparatus to the host apparatus 100 upon a change in the IP information, in addition to the monitoring of the image forming apparatuses 200-1, 200-2, . . . and 200-n and comparing the received IP information with the preset information.

If the host apparatus 100 receives the IP change packet, the data format in FIG. 2 includes change information and response information.

In this case, the first controller 160 detects changed IP information of the concerned image forming apparatus upon reception of the IP change packet of the image forming apparatus.

The host apparatus 100 may transmit the set IP information to the image forming apparatus server through the first communication interface unit 130. The image forming apparatus server may receive and store information from the host apparatus 100, detect the changed IP information through a communication with the image forming apparatuses 200-1, 200-2, . . . and 200-n and notify the host apparatus 100 of a detection result.

The first communication interface unit 130 may include a wired/wireless communication module which is connected to an external device such as the image forming apparatuses 200-1, 200-2, . . . and 200-n and the image forming apparatus server locally or in a network according to a predetermined protocol.

The first communication interface unit 130 may transmit print data in a predetermined print language to the image forming apparatuses 200-1, 200-2, . . . and 200-n, receive scan data which are generated by a scanned document from the image forming apparatuses 200-1, 200-2, . . . and 200-n, and transmit a result of the changed IP information to a user (or an administrator) by email or other means.

The first user interface unit 140 receives a user's selection whether to change a port of an image forming apparatus if the changed IP information of at least one of the image forming apparatuses 200-1, 200-2, . . . and 200-n is detected.

The first user interface unit 140 includes a keyboard, a mouse, etc. which is provided as an input device of the host apparatus 100. The first user interface unit 140 may include a graphic user interface (hereinafter to be called UI) which is generated by an execution of a driver or an additional application and displayed on the first display unit 150 to receive a user's input. The UI may include an icon, a button, a text input window, etc. to be selected by a user.

If the first user interface unit 140 includes a UI, the host apparatus 100 receives a user's selection whether to change a port of a predetermined image forming apparatus having a changed IP address in response to an IP change notification window displayed on the first display unit 150 after receiving the changed IP information of the image forming apparatus.

Figure 3:
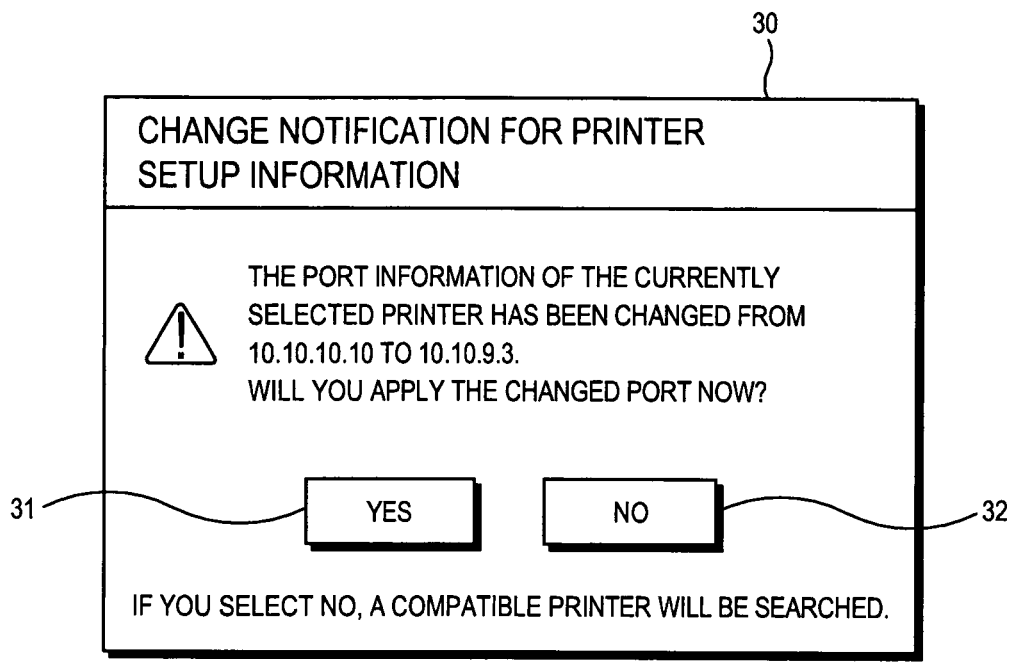
FIGS. 3 to 5 illustrate an example of a notification window which is displayed in the host apparatus.
Figure 4:
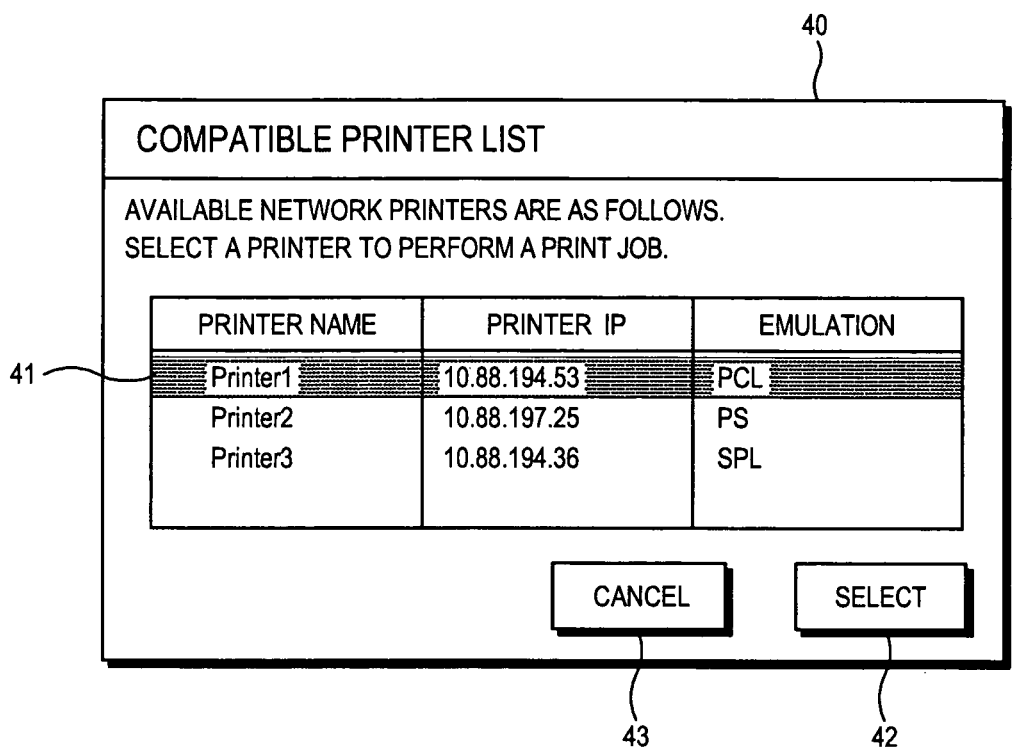
Figure 5:
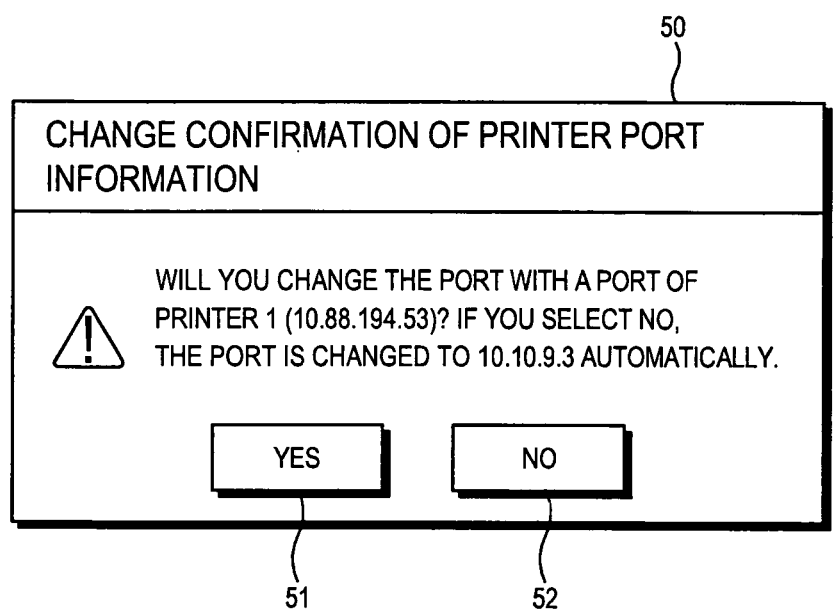

FIGS. 3 to 5 illustrate examples of notification windows displayed in the host apparatus 100 according to the present invention.

If the changed IP information of a predetermined image forming apparatus is received, the first controller 160 may determine whether there is an ongoing print job for the image forming apparatus having the changed IP information, and control the first display unit 150 to display the notification window in FIGS. 3 to 5 if it is determined that there is the ongoing print job.

The first display unit 150 may include a thin film transistor-liquid crystal display (TFT-LCD) and a driver (not shown) to drive the TFT-LCD.

The first controller 160 controls the host apparatus 100 as a whole. The first controller 160 may include software and firmware such as a monitoring program which is incorporated into hardware such as a central processing unit (CPU).

The first controller 160 monitors the changed IP information of at least one of the image forming apparatuses 200-1, 200-2, . . . and 200-n by an execution of the monitoring program.

The first controller 160 may detect the changed IP information by comparing the IP information received from at least one of the image forming apparatuses 200-1, 200-2, . . . and 200-n with the preset network information stored in the first storage unit 120 or detect the changed IP information by receiving the change information from a particular image forming apparatus whose IP information is changed.

Hereinafter, an example of the received changed IP information of one of the image forming apparatuses 200-1, 200-2, . . . and 200-n, e.g., the first image forming apparatus 200-1 will be described.

If the changed IP information of the first image forming apparatus 200-1 is received through the monitoring program, the first controller 160 determines whether there is an ongoing print job for the first image forming apparatus 200-1. The ongoing print job, which is a job before print data are transmitted to the first image forming apparatus 200-1, may include at least one of the cases when a user opens a driver attribute window of the first image forming apparatus 200-1 to perform the print job, when the print job is being spooled by a printer driver of the first image forming apparatus 200-1, when the spooled print job is being transmitted to the first image forming apparatus 200-1 or when port information may not be changed as a driver is used by other causes.

If it is determined that there is an ongoing print job for the first image forming apparatus 200-1, the first controller 160 holds the ongoing print job.

More specifically, if the ongoing print job includes the case when a user opens the driver attribute window, the first controller 160 may close the open attribute window. If the print job is being spooled or being transmitted, the first controller 160 temporarily suspends the spooled or transmitted print job. The first controller 160 may store a current status of the ongoing print job before suspending the job.

The first controller 160 displays a change notification window 30 for setup information in FIG. 3 and notifies a user of the changed IP information of the first image forming apparatus 200-1 which a user desires to use, i.e., perform the job.

The change notification window 30 may display the preset IP information (before change) and the changed IP information (received IP information) for the first image forming apparatus 200-1 to select whether to change a print option with the changed information, i.e., reset the port information.

The change notification window 30, which is a UI operated by the first user interface unit 140, includes at least one of buttons 31 and 32 to be selected by a user.

The first controller 160 may verify the received changed IP information.

More specifically, the first controller 160 may verify the received changed IP information by confirming a response with a test program such as PING or transmitting a test print command to the first image forming apparatus 200-1.

The first display unit 150 may display the verification result as well on the change notification window 30.

A user may change the preset port of the first image forming apparatus 200-1 through the first user interface unit 140 corresponding to the change notification window 30 in FIG. 3, and complete the held print job with the first image forming apparatus 200-1 having the changed port.

A user may reset the port of the first image forming apparatus 200-1 with the changed IP address from the change notification window 30 in FIG. 3.

That is, if a user selects a YES button 31 from the change notification window 30, the first controller 160 resets the preset port information (10.10.10.10) of the first image forming apparatus 200-1 with the changed IP address (10.10.9.3).

The reset port information is stored in the first storage unit 120 together with a change history.

The first controller 160 completes the held print job by using the first image forming apparatus 200-1 whose port information is reset.

That is, the first controller 160 transmits print data corresponding to the held print job according to the changed print option (i.e., port information) to the first image forming apparatus 200-1.

If the held print job refers to an opening of the driver attribute window, the first controller 160 may reopen the closed attribute window or retry the held spooling or transmission to the first image forming apparatus 200-1. Retrying the spooling or the transmission may be performed following the stored performed job or may include a cancellation of the performed job and start of the job.

Even if the changed IP information of the predetermined image forming apparatus 200-1 is received, the host apparatus 100 according to the host apparatus 100 may normally perform the ongoing job without loss.

A user may complete the held print job by changing the print option to select from the change notification window 30 in FIG. 3 a replacement image forming apparatus of the first image forming apparatus 200-1 whose IP information is changed.

That is, if a user selects a NO button 32 from the change notification window 30, the first controller 160 may search another image forming apparatus which is compatible with a driver of the first image forming apparatus 200-1 and display a search result as in FIG. 4.

The searched image forming apparatus may be available in a network.

As shown in FIG. 4, a compatible printer list window 40 displays at least one of network image forming apparatuses (printers 1 from 3) which are compatible with the driver of the first image forming apparatus 200-1.

The first display unit 150 may display thereon a name, IP information and emulation information of the searched available image forming apparatuses, and may additionally display other information as the case may be.

The first display unit 150 may display whether the entire searched image forming apparatuses are compatible or may display compatible printers only according to a priority.

A user may select one (printer 1) image forming apparatus 41 from the list of the image forming apparatuses in FIG. 4. The image forming apparatus 41 which is selected by a user becomes a replacement image forming apparatus 200-1 of the first image forming apparatus 200-1 for the held print job.

The compatible printer list window 40 may further include buttons 42 and 43 to select or cancel the replacement image forming apparatus.

If a user selects the replacement image forming apparatus 41 and a select button 42 in FIG. 4, the first controller 160 completes the held print job by using the selected replacement image forming apparatus 41.

That is, the first controller 160 transmits print data corresponding to the held print job according to the changed print option to the replacement image forming apparatus 41.

Then, the host apparatus 100 according to the embodiment not only performs the ongoing print job without loss by using the replacement image forming apparatus but also enhances a scope of a user's selection if the changed IP information of the predetermined image forming apparatus 200-1 is detected.

If the held print job is completed by the replacement image forming apparatus 41, a user may select whether to change the preset port information stored in the first storage unit 120 with the port information of the replacement image forming apparatus with respect to the image forming apparatus 200-1 whose changed IP information is detected.

That is, the first controller 160 controls the first display unit 150 to display a change confirmation window 50 of printer port information as in FIG. 5 if the replacement image forming apparatus completes the held print job.

The change confirmation window 50 in FIG. 5 includes at least one of buttons 51 and 52 to select whether to change the port information of the first image forming apparatus 200-1, whose changed IP information is detected, with the port information of the replacement image forming apparatus.

If a user selects a YES button 51 from the change confirmation window 50 in FIG. 5, the first controller 160 resets the preset port information (10.10.10.10) of the first image forming apparatus 200-1 with port information (10.88.194.53) of the replacement image forming apparatus.

If a user selects a NO button 52 from the change confirmation window 50 in FIG. 5, the first controller 160 resets the preset port information (10.10.10.10) of the first image forming apparatus 200-1 with the received changed IP information (10.10.9.3) of the first image forming apparatus 200-1.

Without a selection process through the change confirmation window 50 in FIG. 5, the host apparatus 100 may normally complete the ongoing print job by transmitting the print data corresponding to the held print job to the replacement image forming apparatus selected from the printer list window 40 in FIG. 4, and reset the port information of the first image forming apparatus 200-1 with the changed IP information displayed on the change notification window 30 in FIG. 3.

The first controller 160 may control the first display unit 150 to display the reset port information with respect to the image forming apparatus whose IP information is changed according to a selection result in FIG. 3 or 5.

The image forming apparatuses 200-1, 200-2, . . . and 200-n receive print data from the host apparatus 100 and perform a print job.

As shown in FIG. 1, the image forming apparatuses 200-1, 200-2, . . . and 200-n include an image forming unit 210 which performs a print job based on received print data, a second storage unit 220 which stores therein network setup information, a second communication interface unit 230 which communicates with the host apparatus 100, a second user operation unit 240 which receives a user's command, a second display unit 250 which displays a network setup menu for the changed IP information and a second controller 260 which controls the image forming apparatus as a whole.

If the image forming apparatuses 200-1, 200-2, . . . and 200-n include a multi-function printer (MFP) providing a scanning function and a faxing function, they may further include an image scanner (not shown) to scan a document and generate a scan image.

The image forming apparatuses 200-1, 200-2, . . . and 200-n consistently transmit IP information of the image forming apparatuses 200-1, 200-2, . . . and 200-n to the host apparatus 100 in response to a IP notification request packet received from the host apparatus by the monitoring program installed in the host apparatus 100.

The transmitted packet may include a format as in FIG. 3. If the IP information of a predetermined image forming apparatus is changed, the transmitted IP notification packet may further include a flag which indicates a change of the information.

The second storage unit 220 stores therein network setup information including an IP address. The second storage unit 220 may further store therein various print data for a print job, scan data generated by a scanned document, fax data for a fax transmission and various setup information of the image forming apparatus through the second user operation unit 240. The second storage unit 220 includes an internal storage medium such as an HDD, or an external or portable storage medium such as a USB memory, a memory card (memory stick, CF card, and MMC) and a memory card slot.

The second communication interface unit 230 receives print data in a predetermined print language from the outside or transmits scan data to the outside by communicating with the outside including the host apparatus 100 and a server.

The image data which are received from the outside through the second communication interface unit 230 are stored in the second storage unit 220. The second communication interface unit 230 may perform a scan to host function or a scan to server function which transmits scan data to an external device such as the host apparatus 100 or the server according to a predetermined protocol or transmit the scan data to the outside by email.

The second communication interface unit 230 may include a wired/wireless communication module which is connected with an external device such as the host apparatus 100 locally or in a network according to a predetermined protocol, or include a USB port which is connected with a portable storage medium such as a USB memory.

A user may change the IP information of the image forming apparatuses 200-1, 200-2, . . . and 200-n stored in the second storage unit 220 through the second user operation unit 240.

The second user operation unit 240 may include an input button (hereinafter to be called "hard key or keypad") provided in the image forming apparatuses 200-1, 200-2, . . . and 200-n or a graphic user interface (hereinafter to be called UI) which is generated by an execution of an application and displayed on the second display unit 250 to receive a user's input by a touch.

A user's command may be received through the second communication interface unit 220 from the outside such as the host apparatus 100 connected to the image forming apparatuses 200-1, 200-2, . . . and 200-n. A user includes an administrator.

The second display unit 250 may display a UI screen to display setup and job statuses of the image forming apparatuses 200-1, 200-2, . . . and 200-n and receive various commands by a user's touch. The second display unit 250 may include a TFF-LCD and a driver (not shown) to drive the TFT-LCD.

In the image forming apparatuses 200-1, 200-2, ... and 200-n according to the present invention, the second user operation unit 240 may be provided as an icon selected by a user's touch. Thus, the second user operation unit 240 and the second display unit 250 may be provided as a single panel instead of a separate configuration.

The second display unit 250 may include a local display unit which is provided in the image forming apparatuses 200-1, 200-2, ... and 200-n, and a remote display unit which is provided in the host apparatus 100 or an administrator terminal connected to the image forming apparatuses 200-1, 200-2, ... and 200-n through the second communication interface unit 230. If the second display unit 250 includes the remote display unit, a touchable UI of the second user operation unit 240 may include a remote user interface (RUI) or a web user interface (MI).

A user may change the preset IP information stored in the second storage unit 220 of the image forming apparatuses 200-1, 200-2, ... and 200-n.

If the IP address should be changed due to change of environment, etc., a user may change the IP information by selecting the network setup menu through the second user operation unit 240.

The second controller 260 determines whether there is an ongoing print job for the concerned image forming apparatus if the network setup menu is selected.

The ongoing print job may include the cases when print data are being received from the host apparatus 100, when scan data are being transmitted from the image forming apparatuses 200-1, 200-2, ... and 200-n to the host apparatus 100, when the image forming apparatuses 200-1, 200-2, ... and 200-n are performing a predetermined job, e.g., a print job and when a fax is being received.

Figure 6:
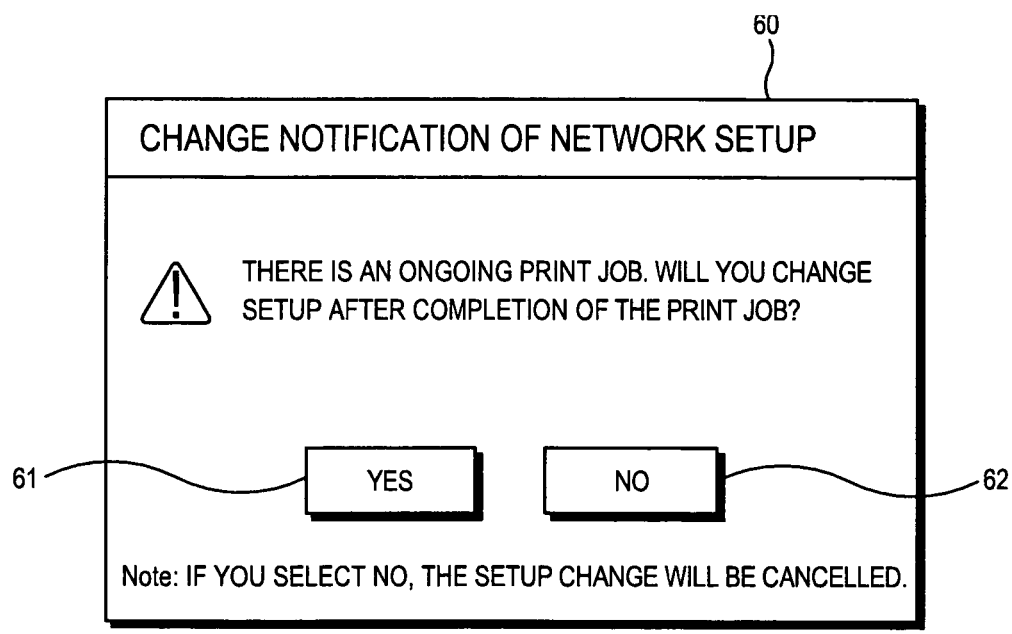
FIG. 6 illustrates an example of a notification window which is displayed in the image forming apparatus.

If it is determined that there is the ongoing print job for the concerned image forming apparatus, the second controller 260 may control the second display unit 250 to display an job notification window 60 as in FIG. 6.

A user may select whether to change the IP information from the job notification window 60 in FIG. 6 after the ongoing print job is completed.

The job notification window 60 may include at least one of buttons 61 and 62 to select whether to change the IP information.

If a user selects a YES button 61 in FIG. 6, the second controller 260 completes the ongoing print job and changes and resets the preset IP information in the second storage unit 220 upon a completion of the job.

If the IP information of the image forming apparatuses 200-1, 200-2, ... and 200-n is changed as above, a packet including the changed IP information is transmitted to the host apparatus 100 through the second communication interface unit 230 by the monitoring program.

Then, the host apparatus 100 determines whether the IP information of the predetermined image forming apparatus is changed through the IP information packet.

Meanwhile, if a user selects a NO button 62 in FIG. 6, the second controller 260 cancels the change of the IP information and completes the ongoing print job.

If the image forming apparatus server (not shown) is provided separately, at least one of the image forming apparatuses 200-1, 200-2, ... and 200-n may store various information including the IP information in a storage unit of the server and the host apparatus 100 may receive the IP information from the server and monitor whether the IP information of the predetermined image forming apparatus is changed.

The host apparatus 100 may be connected to the image forming apparatus server 300 according to a predetermined period, monitor the change of the IP information and notify an administrator of a monitoring result through the first communication interface unit 130 by email.

Accordingly, even if the IP information of the predetermined image forming apparatus is changed during a print job, the host apparatus 100 and the image forming apparatuses 200-1, 200-2, ... and 200-n according to the present invention normally complete the ongoing print job, thereby reducing data loss and providing convenience for a user.

In the network print system 10 with the foregoing configuration, the print job performing process of the host apparatus 100 and image forming apparatuses 200-1, 200-2, ... and 200-n will be described with reference to FIGS. 7A, 7B and 8.

Figure 7A:
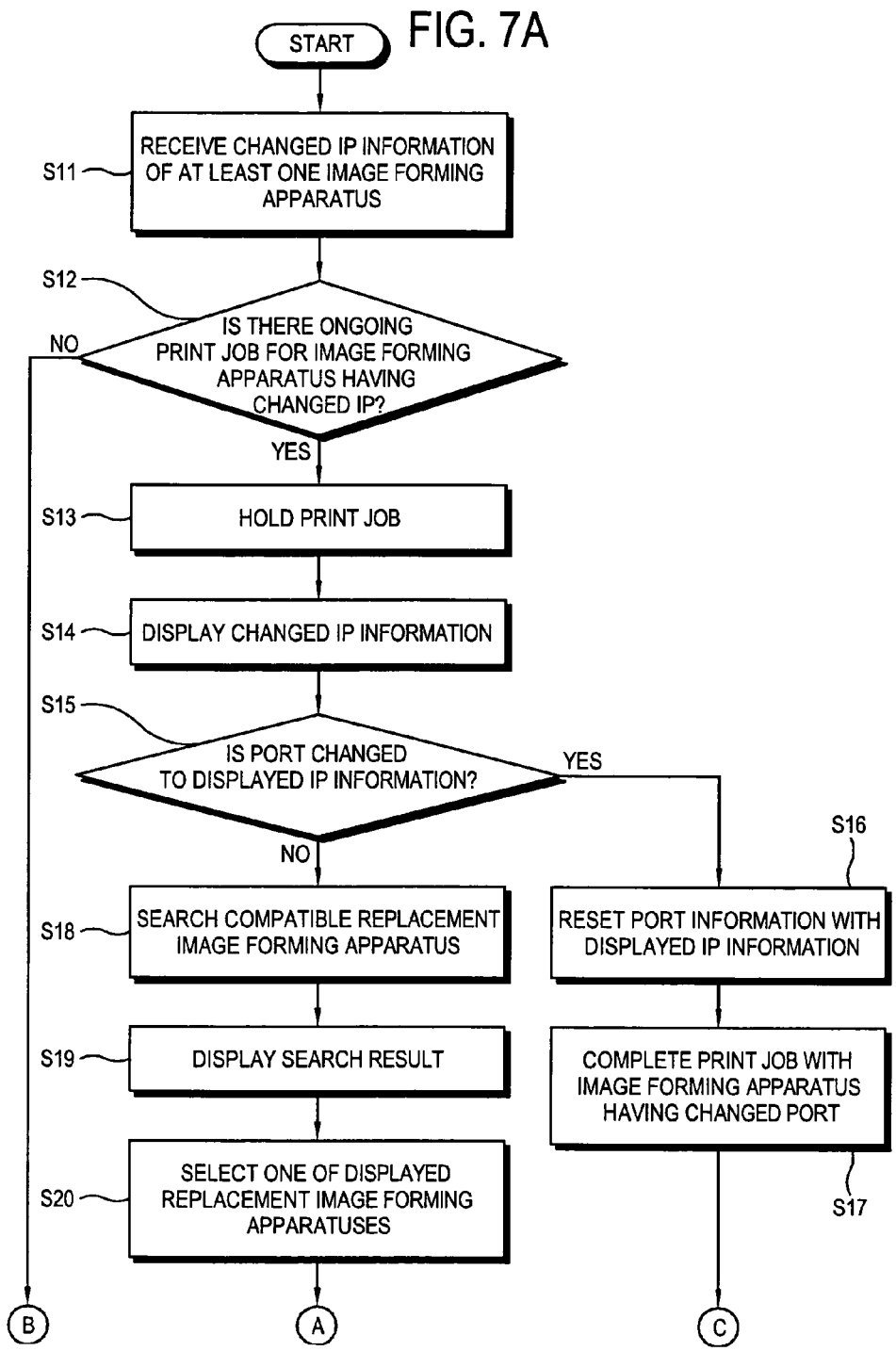
FIGS. 7A and 7B are flowcharts which illustrate an job performing method of the host apparatus.
Figure 7B:
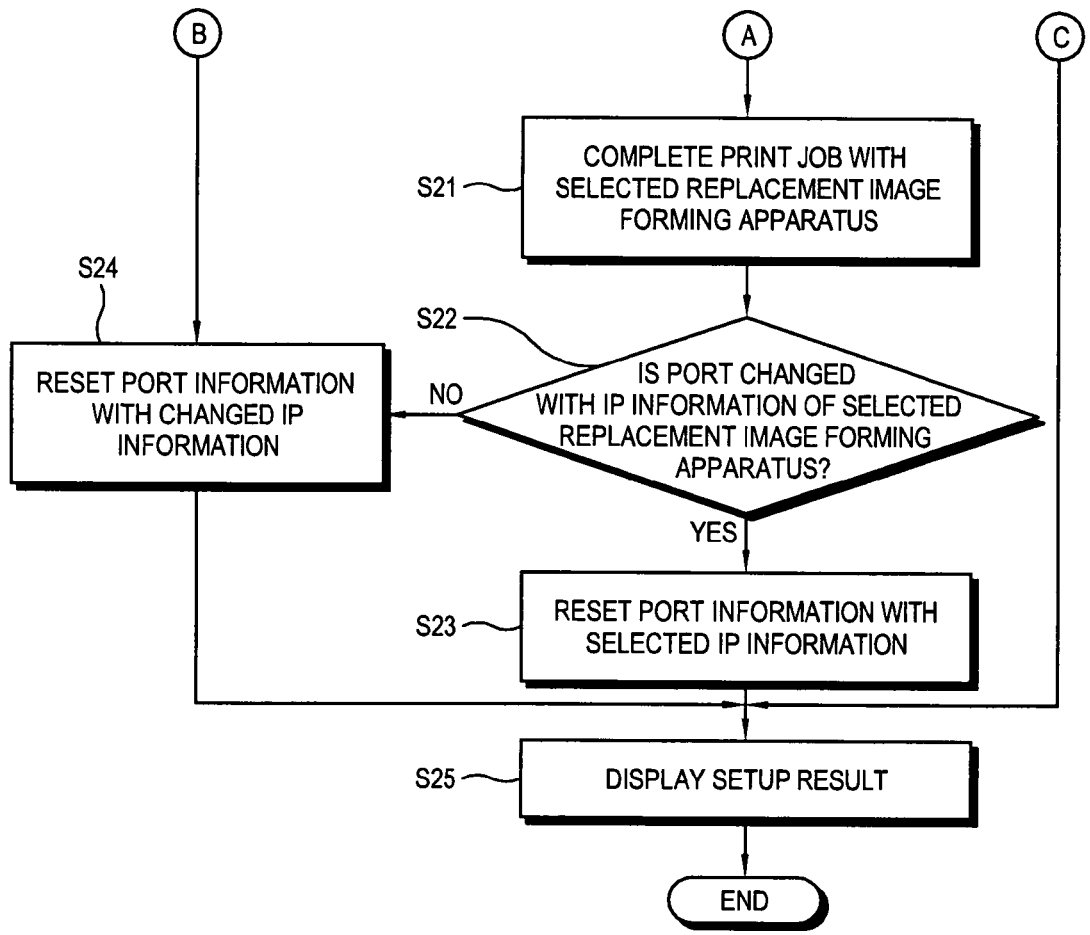

FIGS. 7A and 7B are flowcharts which illustrate a job performing method of the host apparatus 100 according to an embodiment.

As shown therein, the host apparatus 100 may receive the changed IP information of at least one of the image forming apparatuses 200-1, 200-2, ... and 200-n (S11). The first controller 160 may determine whether the IP information is changed by comparing the network setup information received from at least one of the image forming apparatuses 200-1, 200-2, ... and 200-n with the prestored port information, or by receiving information on the change of the IP information from image forming apparatuses 200-1, 200-2, ... and 200-n.

The first controller 160 determines whether there is the ongoing print job for the image forming apparatus having the changed IP information (S12). The ongoing print job, which is a job before the print data are transmitted to the concerned image forming apparatus, may include at least one of the cases when a user opens the driver attribute window of the image forming apparatus to perform the print job, when the print job is being spooled, and when the spooled print job is being transmitted to the image forming apparatus whose IP information is changed.

If it is determined at operation S12 that there is the ongoing print job, the first controller 160 holds the ongoing print job (S13). Holding the ongoing print job may include storing and suspending the performed job.

The first controller 160 displays the changed IP information received at operation S11 and notifies a user of the changed IP information of the image forming apparatus selected for the print job (S14). That is, the first controller 160 may notify the changed IP information by displaying the change notification window 30 on the first display unit 150 as in FIG. 3.

The first controller 160 may verify the IP information received at operation S11. More specifically, the first controller 160 may verify the received changed IP information by confirming a response with a test program such as PING or transmitting a test print command to the image forming apparatus. The first controller 160 may control the first display unit 150 to display the verification result as well on the change notification window 30.

A user may select whether to change the port of the image forming apparatus used at operation S12 with the IP information displayed at operation S14 (S15).

If a user selects to change the port with the IP information displayed at operation S14, the first controller 160 resets the preset port information with the changed IP address detected at operation S11 (S16). Then, the print option for the ongoing print job is changed.

If the port information is reset at operation S16, the first controller 160 completes the print job held at operation S13 by using the image forming apparatus whose port is changed at operation S16 (S17). Then, the first controller 160 completes the held print job by transmitting the print data corresponding to the print job to the image forming apparatus having the changed IP information according to the changed print option at operation S16.

If a user selects not to change the port information with the IP information displayed at operation S14, the first controller 160 searches at least one replacement image forming apparatus which is compatible with the driver of the image forming apparatus having the changed IP information (S18).

The first display unit 150 displays thereon the search result (S19). The first display unit 150 may display a list of compatible replacement image forming apparatuses as a search result as in FIG. 4.

A user may select one of the replacement image forming apparatuses displayed at operation S19 (S20). Then, the print option for the print job held at operation S13 is changed.

The first controller 160 completes the print job held at operation S13 by using the replacement image forming apparatus selected at operation S20 (S21). That is, the first controller 160 may complete the print job by transmitting the print job held at operation S13 to the replacement image forming apparatus selected at operation S20.

A user may select whether to change the port information of the image forming apparatus having the changed IP information with the IP information of the replacement image forming apparatus (S22). The first display unit 150 may receive a user's selection regarding the change of the port information by displaying the change confirmation window 50 in FIG. 5.

If a user selects to change the port information with the IP information of the replacement image forming apparatus, the first controller 160 resets the port information of the image forming apparatus having the changed IP information with the IP information corresponding to a user's selection (S23).

If a user selects not to change the port information with the IP information of the replacement image forming apparatus, the first controller 160 resets the port information with the changed IP information detected at operation S11 (S24).

The operations S22 and S23 may be performed selectively. That is, if the held print operation is completed by the replacement image forming apparatus at operation S21, the first controller 160 may reset the port information with the changed IP information received at operation S11 without an additional process of a user's selection.

If there is no ongoing print job for the image forming apparatus whose IP information is changed, the first controller 160 resets the port information with the changed IP information (S24).

The first display unit 150 displays the setup result (S25). The port information which is reset at operation S23 or S24 is stored in the first storage unit 120 together with the change history.

Figure 8:
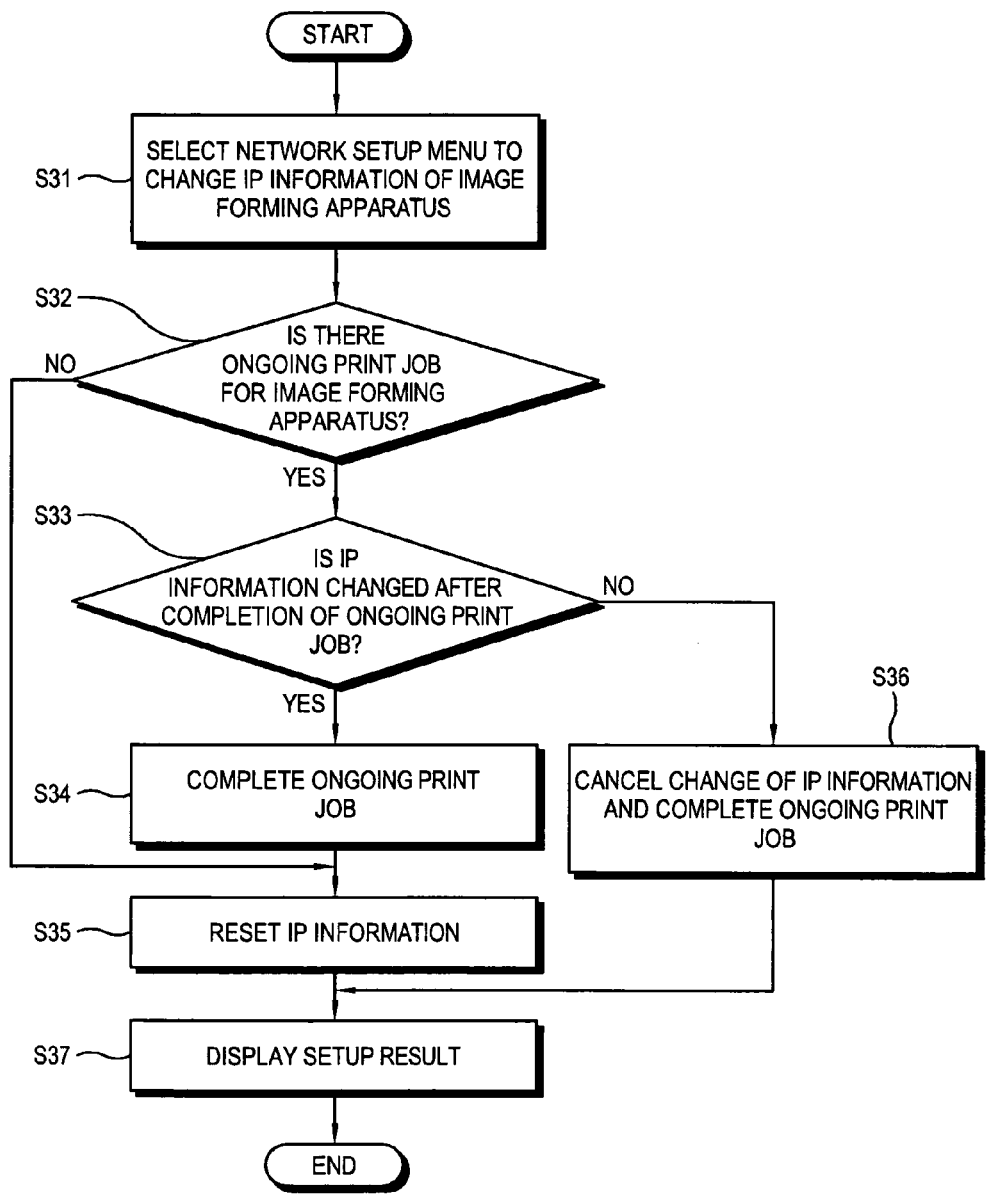
FIG. 8 is a flowchart which illustrates a job performing method of the image forming apparatus.

FIG. 8 is a flowchart which illustrates a job performing method of the image forming apparatuses 200-1, 200-2, . . . and 200-n according to an embodiment.

A user may select the network setup menu to change the IP information of the image forming apparatuses 200-1, 200-2, . . . and 200-n (S31).

If the network setup menu is selected at operation S31, the second controller 260 determines whether there is the ongoing print job for the image forming apparatuses 200-1, 200-2, . . . and 200-n (S32). The ongoing print job may include at least one of the cases when the data are transmitted to or received from the host apparatus 100 connected to the image forming apparatuses 200-1, 200-2, . . . and 200-n and when the print job is being performed in the image forming apparatuses 200-1, 200-2, . . . and 200-n.

If there is the ongoing print job at operation S32, a user may select whether to change the IP information after completing the ongoing print job (S33).

If a user selects to change the IP information after the completion of the ongoing print job, the second controller 260 completes the print job (S34).

The second controller 260 changes and resets the IP information according to a selection made at operation S33 (S35).

If a user selects not to change the IP information at operation S33, the second controller 260 cancels the change of the IP information at operation S31 and completes the ongoing print job (S36).

Meanwhile, if there is no ongoing print job at operation S32, the second controller 260 changes and resets the IP information (S35).

The second display unit 250 displays the setup result (S37). The IP information which is reset at operation S35 is stored in the second storage unit 220 together with the change history.

The second controller 260 transmits the changed IP information in a predetermined packet to the host apparatus 100.

According to the exemplary embodiment, even if the IP information is changed during the print job, the host apparatus and the image forming apparatuses normally complete the ongoing print job, thereby reducing data loss and unnecessary time consumption. Further, the host apparatus 100 completes the print job through the replacement image forming apparatus, thereby enhancing a scope of selection for a user.

As described above, a host apparatus connected to an image forming apparatus and a print control method thereof according to the embodiments may normally perform a print job by changing a port of an image forming apparatus and prevent data loss due to a failure to change the port normally even if there is a print job for an image forming apparatus whose IP address is changed.

Also, the host apparatus according to the embodiments normally performs the print job by using a replacement image forming apparatus of the image forming apparatus having the changed IP address, thereby enhancing a scope of selection for a user, reducing waste of unnecessary time and providing convenience for a user.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. A print control method of a host apparatus which is connected to at least one image forming apparatus in a network, the method comprising:
  receiving changed Internet Protocol (IP) information from the at least one image forming apparatus;
  determining whether the host apparatus performs a print job with respect to the at least one image forming apparatus which has the changed IP information;
  holding the print job if there is the print job;
  changing a print option for the print job; and
  transmitting print data corresponding to the print job according to the changed print option,
  wherein the changing the print option for the print job comprises resetting port information of the at least one image forming apparatus having the changed IP information with the changed IP information or changing a port of the at least one image forming apparatus having the changed IP information with IP information of another image forming apparatus which is compatible with a driver of the at least one image forming apparatus having the changed IP information, and the changing the print option for the print job comprises searching at least one other image forming apparatus which is compatible with a driver of the at least one image forming apparatus whose changed IP information is detected, and displaying a search result if a port of the at least one image forming apparatus having the changed IP information is changed to IP information of the at least one other image forming apparatus compatible with the driver of the at least one image forming apparatus having the changed IP information.

2. The method according to claim 1, further comprising selecting at least one image forming apparatuses which is displayed according to the search result.

3. The method according to claim 2, further comprising selecting whether to reset port information of the at least one image forming apparatus having the changed IP information with the IP information of the selected image forming apparatus.

4. The method according to claim 1, wherein the print job comprises a print job before print data are transmitted to the at least one image forming apparatus.

5. The method according to claim 1, wherein the receiving the changed IP information comprises determining whether the IP information is changed by monitoring setup information received from the at least one image forming apparatus having the changed IP information, or receiving setup information on a change of the IP information from the at least one image forming apparatus having the changed IP information.

6. The method according to claim 1, further comprising verifying the changed IP information.

7. A host apparatus which is connected to at least one image forming apparatus in a network, the host apparatus comprising:

a communication interface unit which receives changed Internet Protocol (IP) information from the at least one image forming apparatus;

a storage unit which stores therein setup information comprising a print option for the at least one image forming apparatus;

a user interface unit which receives a user's selection; and a controller which determines whether the host apparatus performs a print job with respect to the at least one image forming apparatus having the changed IP information received through the communication interface unit, holds a print option if there is the print job, changes the print option for the print job according to the user's selection and stores the changed print option in the storage unit, and controls the communication interface unit to transmit print data corresponding to the print job according to the changed print option, the controller changing the print option for the print job by resetting port information of the at least one image forming apparatus having the changed IP information with the changed IP information or by changing a port of the at least one image forming apparatus having the changed IP information with IP information of another image forming apparatus which is compatible with a driver of the at least one image forming apparatus whose changed IP information is detected; and a display unit, wherein the controller controls the communication interface unit to search at least one image other forming apparatus which is compatible with a driver of the image forming apparatus, whose changed IP information is detected, and controls the display unit to display a search result if a port of the at least one image forming apparatus having the changed IP information is changed to IP information of the at least one other image forming apparatus compatible with the driver of the at least one image forming apparatus whose changed IP information is detected.

8. The host apparatus according to claim 7, wherein the display unit displays at least one image forming apparatus to be selected according to the search result, and the user interface unit is used to select one of the at least one displayed image forming apparatuses.

9. The host apparatus according to claim 8, wherein the user interface unit is used to select whether to reset port information of the at least one image forming apparatus, whose IP information is changed, with IP information of the selected image forming apparatus.

10. The host apparatus according to claim 7, wherein the print job comprises a job before print data are transmitted to the at least one image forming apparatus.

11. The host apparatus according to claim 7, wherein the controller determines whether the IP information is changed by monitoring setup information received from the at least one image forming apparatus having the changed IP information through the communication interface unit or receives the changed IP information by receiving the setup information on the change of the IP information from the at least one image forming apparatus having the changed IP information.

12. The host apparatus according to claim 7, wherein the controller controls the communication interface unit to verify the changed IP information.

13. The host apparatus according to claim 7, further comprising an image processor which generates print data in a predetermined print language according to a print command received through the user interface unit.

* * * * *